United States Patent [19]

Mohr

[11] Patent Number: 4,978,000
[45] Date of Patent: Dec. 18, 1990

[54] CONVEYOR SYSTEM INCLUDING DISCHARGE PULLEY

[75] Inventor: Helmut Mohr, Duisburg, Fed. Rep. of Germany

[73] Assignee: PWH Anlagen & Systeme GmbH, Ingbert-Rohrbach, Fed. Rep. of Germany

[21] Appl. No.: 274,801

[22] PCT Filed: Apr. 4, 1987

[86] PCT No.: PCT/EP87/00186

§ 371 Date: Nov. 14, 1988

§ 102(e) Date: Nov. 14, 1988

[87] PCT Pub. No.: WO87/06917

PCT Pub. Date: Nov. 19, 1987

[30] Foreign Application Priority Data

May 10, 1986 [DE] Fed. Rep. of Germany ....... 3615769

[51] Int. Cl.$^5$ .............................................. B65G 31/00
[52] U.S. Cl. .................................. 198/641; 198/842; 198/861.2
[58] Field of Search ................. 198/641, 860.1, 861.1, 198/861.2, 861.3, 860.3, 842

[56] References Cited

U.S. PATENT DOCUMENTS

| | | | |
|---|---|---|---|
| 1,278,055 | 9/1918 | Stuart | 198/861.2 X |
| 2,781,892 | 2/1957 | Thevenieau | 198/641 X |
| 3,107,004 | 10/1963 | Arndt | 198/861.2 X |
| 3,680,681 | 8/1972 | Burk | 198/812 X |
| 3,807,549 | 4/1974 | Cowdery et al. | 198/136 |
| 4,128,166 | 12/1978 | Kovats | 198/861.1 X |

FOREIGN PATENT DOCUMENTS

| | | | |
|---|---|---|---|
| 0511814 | 6/1952 | Belgium | 198/641 |
| 1112010 | 7/1961 | Fed. Rep. of Germany | |
| 0153706 | 9/1984 | Japan | 198/861.2 |
| 0256630 | 11/1969 | U.S.S.R. | 198/861.2 |
| 1260193 | 9/1986 | U.S.S.R. | 198/861.1 |

Primary Examiner—H. Grant Skaggs
Assistant Examiner—D. Glenn Dayoan
Attorney, Agent, or Firm—Spencer & Frank

[57] ABSTRACT

Conveyor belt system for varying the parabola of fall of a conveyed material, has an endless conveyor belt having upper and lower runs supported by and traveling along a belt carrier, and the conveyed material is projected from the conveyor belt at the downsteam end of the upper run. The conveyor belt system also has a support roller carrier having upstream and downstream ends, and a plurality of support rollers for supporting the upper run of the endless conveyor belt. The support roller carrier is pivotably attached at its upstream end to the carrier. There is a return pulley for guiding the endless conveyor belt from its upper to its lower run, and the parabola of fall of the conveyed material is varied by use of a vertically adjustable snub pulley. A pivot arm varies the height of the pulley and is actuated by a hydraulic cylinder. In addition, a supporting roller is rotatably attached to the downstream end of the roller carrier and engages the upper surface of the pivot arm for pivoting the downstream end of the support roller carrier about its upstream end when the pivot arm means is pivoted.

6 Claims, 1 Drawing Sheet

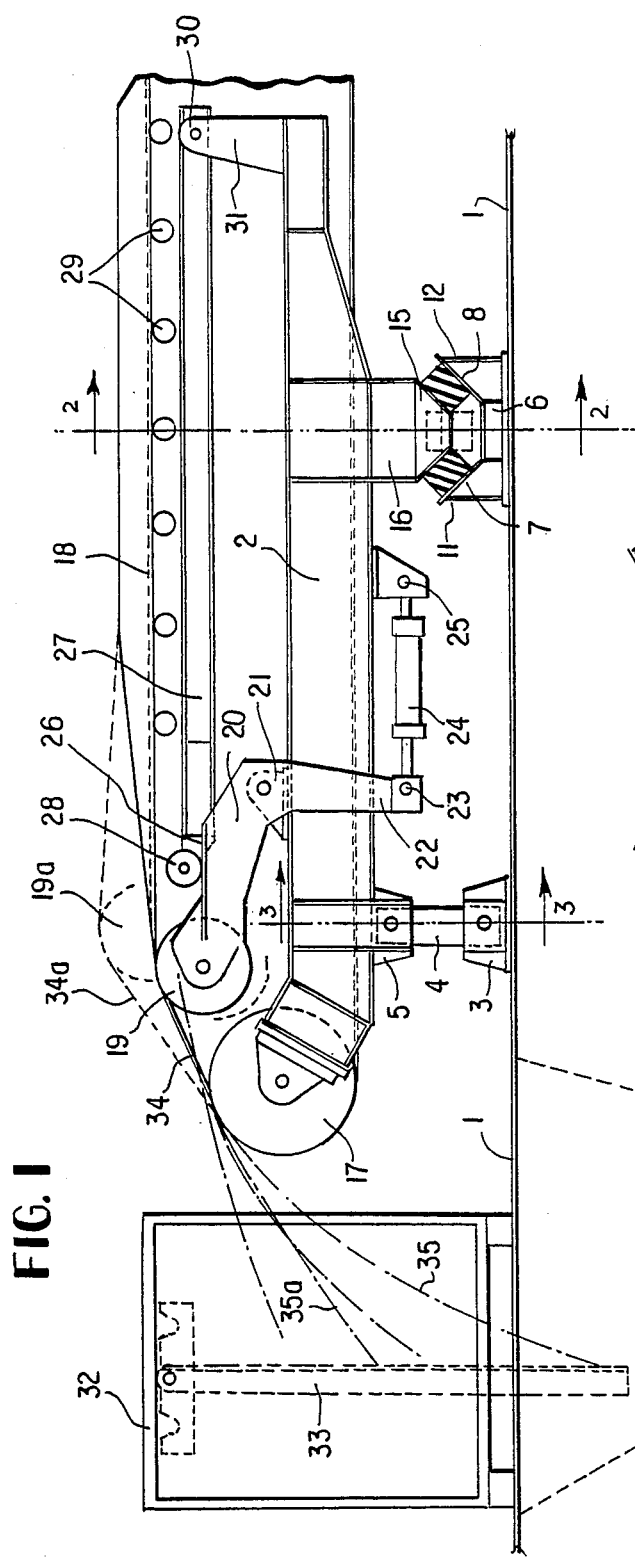
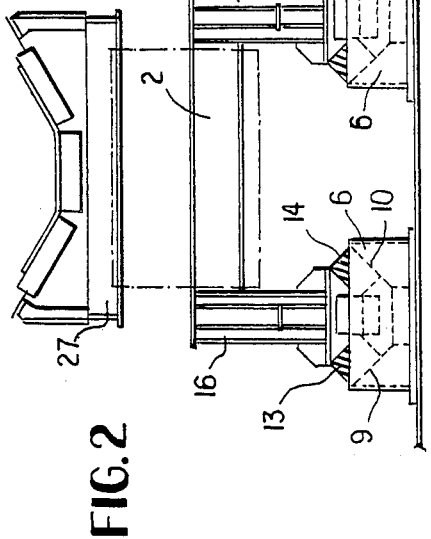
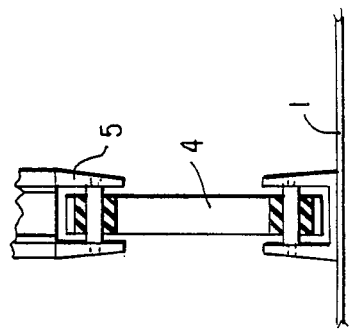
FIG. 1
FIG. 2
FIG. 3
FIG. 4

CONVEYOR SYSTEM INCLUDING DISCHARGE PULLEY

BACKGROUND OF THE INVENTION

1. Field of the Invention

The invention relates to a conveyor belt system equipped with a discharge pulley and various preceding support rollers.

2. Background Art

In prior art conveyor belt systems, the discharge pulleys and the support rollers immediately preceding them are firmly mounted at the front end of the belt carrier. Since, moreover, the speed at which the belt of the conveyor system moves is generally fixed, it is practically impossible to change the parabola of fall during operation of the belt conveyor system. The unchangeable parabola of fall is a drawback in conveyor systems particularly when conveying sticky or dusty material or a material tending to form bridges.

SUMMARY OF THE INVENTION

It is an object of the invention to provide an apparatus with simple means to change the parabola of fall downstream of the discharge pulley of a conveyor belt system during operation so that the parabola of fall can be adapted to different types of material being conveyed and can be set to a defined parabola of fall. In this way it is possible, for example, to prevent the occurrence of spills or clogging during the transfer of conveyed materials.

Also, for example, the development of dust can be reduced if dusty materials are conveyed. The invention solves the problem at hand by the features of a conveyor belt system for varying the parabola of fall of a conveyed material, comprising (a) a belt carrier having upstream and downstream ends; (b) an endless conveyor belt having upper and lower runs and being supported by and traveling along said belt carrier, said upper run traveling from said upstream to said downstream end of said belt carrier, the conveyed material being projected from the conveyor belt at the downstream end of said upper run; (c) a support roller carrier having upstream and downstream ends and having a plurality of rotatably attached support rollers for supporting said upper run of said endless conveyor belt, said support roller carrier being pivotably attached at its upstream end to said belt carrier; (d) a return pulley means rotatably attached to said belt carrier at its downstream end for guiding said endless conveyor belt from its upper to its lower run; and (e) means for varying the parabola of fall of a conveyed material projected from said downstream end of said conveyor belt, including: (1) a snub pulley means disposed upstream of said return pulley means for varying the height of said conveyor belt; (2) a pivot arm means attached to said snub pulley means and pivotably attached to said belt carrier for varying the height of said snub pulley means, said pivot arm means having an upper surface; (3) hydraulic cylinder means attached to said pivot arm means for pivoting said pivot arm means; and (4) a supporting roller means rotatably attached to said downstream end of said support roller carrier and engaging the upper surface of said pivot arm means for pivoting said downstream end of said support roller carrier about its upstream end when said pivot arm means is pivoted to thereby adjust the slope of said carrier belt at the downstream end of said upper run.

In the apparatus according to the invention, the additional arrangement of a snub pulley which is adjustable in any case in front of the discharge pulley-when seen in the conveying direction-permits the slope of the conveyor belt, before it runs onto return pulley, to be changed and thus the parabola of fall to be set. The conveyor belt is brought downward at a different angle in front of the return and drive pulleys depending on the height position to be set for the return pulley. The parabola of fall can be set by making the slope of the descending belt section in front of the return pulley adjustable. Thus, the parabola of fall can be selected in such a way that the material being conveyed is properly transferred even if, for example, the material is sticky. A bridge formation in the region of the dumped material can be avoided. On the other hand, the development of dust, if dusty material is conveyed, can also be reduced by setting the parabola of fall. The further measures defined in the dependent claims serve this purpose in particular in that the development of structure borne noise is reduced to a minimum by mounting the belt carrier on the belt frame in an elastic bearing.

DE-AS No. 1,112,010 (Federal Republic of Germany, Auslegeschrift) discloses a tripper device for discharging material from sectional conveyors where the device includes a frame which supports the tripper and rests on a movable undercarriage. The return pulley, when used as the tripper car, here acts as the discharge pulley. Seen in the conveying direction, a tripper pulley is disposed behind the discharge pulley to return the belt into the conventional loop shape. If the return pulley is no longer intended to act as the discharge pulley, the tripper pulley must be removed. Then one reach of the conveyor belt moves over the now lowerable return pulley in the normal manner. The return pulley, which may temporarily act as a discharge pulley, is then mounted at the end of a pivotally hinged head piece of the belt carrier. The head piece is fastened to the tripper frame by means of pins and can be lowered and raised by means of a suitable lifting device. Obviously, the head piece is provided with further pins to support the conveyor belt but their position relative to the head piece is fixed and they can be raised or lowered only together with the head piece.

Further details of the invention will be described with reference to an embodiment that is schematically illustrated in the drawing figures which show the following:

BRIEF DESCRIPTION OF THE DRAWINGS

FIG. 1, the end of a sectional conveyor system with discharge pulley, side view;

FIG. 2, a sectional view in the plane 2—2;

FIG. 3, a sectional view in the plane 3—3.

FIG. 4, an enlarged partial sectional view of FIG. 3.

DETAILED DESCRIPTION OF THE PREFERRED EMBODIMENTS

The leading end of a belt carrier 2 is supported on the belt foundation 1. For this purpose, the front end of belt foundation 1 is provided, on the one hand, with a supporting block 3 which hingedly supports a hinged support 4 which is further hingedly supported on its other side in a supporting block 5 at belt carrier 2.

Additionally, belt foundation 1 is provided with a supporting block 6 which is equipped with four supporting faces 7, 8, 9 and 10 forming the faces of a pyramid.

These supporting faces 7, 8, 9 and 10, which are arranged in the shape of a pyramid, lie against rubber buffers 11, 12, 13 and 14 on which is supported the supporting member 15—likewise in the form of a four-sided pyramid—of a further supporting block 16 which is fastened to belt carrier 2.

In each case, belt carrier 2 is supported with respect to belt foundation 1 by means of two of the above described supporting devices disposed on both sides of belt carrier 2.

At its front end, belt carrier 2 is provided with a drive and return pulley 17 whose bearing and drives are not shown in detail. Conveyor belt 18 is guided around this return pulley 17 and, seen in the transporting direction, shortly before reaching return pulley 17, is supported by a snub pulley 19. Snub pulley 19 is mounted on both sides in pivot levers 20 which are configured as double, i.e., angle levers.

These angle levers are mounted in further supporting blocks 21 at belt carrier 2 while their other lever arm 22 extends vertically (e.g., toward the bottom or the top) below or above the frame of belt carrier 2. In FIG. 1 an embodiment in which lever arm 22 extends vertically downwardly is shown. There, hydraulic cylinders 24 are hinged to pivot levers 20 at hinge points 23, with the other side of the hydraulic cylinders being hinged to belt carrier 2 at 25.

The last support roller carrier 27 is supported by its own support rollers 28 on the upper portion of pivot levers 20 on roll-off faces 26. The last support roller carrier 27 which supports support rollers 29 has its other end supported in a hinged manner in a bearing 30 at a supporting block 31 of belt carrier 2.

The supporting frame 32 for a deflector 33 which can be hung at different distances from return pulley 17 is disposed opposite return pulley 17. The deflector is shown in a center position.

With the aid of hydraulic cylinder 24, the two pivot levers 20 can be tilted, thus permitting snub pulley 19 to be set at different height positions, as indicated, for example, by dashed lines 19a. Corresponding to the different heights of snub pulley 19, the belt end 34 immediately in front of return pulley 17 can be set to different slopes as shown, for example, by the dot-dash position 34a. Corresponding to the different slopes of these belt sections, different parabolas of fall 35, 35a, etc. result.

I claim:

1. A conveyor belt system for varying the parabola of fall of a conveyed material, comprising:
   (a) a belt carrier having upstream and downstream ends;
   (b) an endless conveyor belt having upper and lower runs and being supported by and traveling along said belt carrier, said upper run traveling from said upstream to said downstream end of said belt carrier, the conveyed material being projected from the conveyor belt at the downstream end of said upper run;
   (c) a support roller carrier having upstream and downstream ends and having a plurality of rotatably attached support rollers for supporting said upper run of said endless conveyor belts, said support roller carrier being pivotably attached at its upstream end to said belt carrier;
   (d) a return pulley means rotatably attached to said belt carrier at its downstream end for guiding said endless conveyor belt from its upper to its lower run; and
   (e) means for varying the parabola of fall of a conveyed material projected from said downstream end of said conveyor belt, including
      (1) a snub pulley means disposed upstream of said return pulley means for varying the height of said conveyor belt;
      (2) a pivot arm means attached to said snub pulley means and pivotably attached to said belt carrier for varying the height of said snub pulley means, said pivot arm means having an upper surface;
      (3) hydraulic cylinder means attached to said pivot arm means for pivoting said pivot arm means; and
      (4) a supporting roller means rotatably attached to said downstream end of said support roller carrier and engaging the upper surface of said pivot arm means for pivoting said downstream end of said support roller carrier about its upstream end when said pivot arm means is pivoted to thereby adjust the slope of said carrier belt at the downstream end of said upper run.

2. A device as in claim 1, wherein said pivot arm means includes two vertically extending pivot levers connected together to form a double-arm lever having one end attached to said snub pulley means and a free end attached to said hydraulic cylinder means.

3. A device as in claim 1, further comprising a supporting block for elastically supporting said belt carrier so that said belt carrier is elastically yielding in the direction of travel and transverse to the direction of travel of said endless conveyor belt.

4. A device as in claim 3, wherein said supporting block has four supporting faces configured as a four-sided pyramid, and a rubber buffer disposed adjacent to each said supporting face.

5. A device as in claim 3, further comprising a hinged support pivotably attached to said belt carrier and being disposed downstream of said supporting block.

6. A device as in claim 5, further comprising rubber pin bearing means for pivotably attaching said hinged support to said belt carrier.

* * * * *